(12) United States Patent
Hsieh et al.

(10) Patent No.: US 8,706,670 B2
(45) Date of Patent: Apr. 22, 2014

(54) RELATIVE VARIABLE SELECTION SYSTEM AND SELECTION METHOD THEREOF

(75) Inventors: Tsung-Jung Hsieh, Hsinchu (TW); Wei-Chang Yeh, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 419 days.

(21) Appl. No.: 13/075,285

(22) Filed: Mar. 30, 2011

(65) Prior Publication Data
US 2012/0179638 A1 Jul. 12, 2012

(30) Foreign Application Priority Data

Jan. 11, 2011 (TW) .............................. 100101027 A

(51) Int. Cl.
*G06N 5/02* (2006.01)
(52) U.S. Cl.
CPC ....................................... *G06N 5/02* (2013.01)
USPC .......................................................... 706/46
(58) Field of Classification Search
CPC ....................................................... G06N 5/02
USPC .......................................................... 706/46
See application file for complete search history.

(56) References Cited

U.S. PATENT DOCUMENTS

2007/0270994 A1* 11/2007 Dobson et al. ................ 700/121

OTHER PUBLICATIONS

Heish et al ("Forecasting stock markets using wavelet transforms and recurrent neural networks: An integrated system based on artificial bee colony algorithm" submitted on Feb 6, 2010 and available online Oct 30, 2010).*
Duncan Cramer ("Advanced Quantitative Data Analysis" 2003).*

* cited by examiner

*Primary Examiner* — Lut Wong
(74) *Attorney, Agent, or Firm* — Harness, Dickey & Pierce, PLC

(57) ABSTRACT

The present invention discloses a relative variable selection system and a selection method thereof. In the present invention, the receiving module receives a plurality of variables. Based on a correlation coefficient of variables, a first selection module sequentially selects variables with a correlation coefficient greater than a first threshold value. Based on the variables selected by the first selection module, a first calculating module selects a regression value and a weighted value corresponding to the foregoing variables. Based on the weighted values, a second selection module sequentially selects variables with a weighted value smaller than a second threshold value. Based on the variables selected by the second selection module, a second calculating module calculates analyzed values of the foregoing variables. Based on the analyzed values of the variables, a third selection module selects analyzed values which are greater than the target value.

12 Claims, 3 Drawing Sheets

RELATIVE VARIABLE SELECTION SYSTEM AND SELECTION METHOD THEREOF

BACKGROUND OF THE INVENTION

1. Field of the Invention

The present invention relates to a relative variable selection system and a selection method thereof, and more particularly to a relative variable selection system and a selection method thereof capable of selecting a relative variable effectively.

2. Description of Related Art

As global economy and stock market grow rapidly in recent years, stock price prediction becomes an important subject for both companies and individuals. As to companies, an accurate stock price prediction is applied to banks, stocks and securities, or venture capitals for a more efficient investment plan to create higher profit. As to individual investors, the accurate stock price prediction can provide a stock price trend and lower the risk of investments.

In addition to the technical analysis and basic analysis, conventional stock price predictions adopt the popular neural network prediction model, and researches indicated that the use of the neural network as the stock price prediction model has a relatively accurate prediction performance. However, the application of neural networks on the stock price prediction is very limited due to the lack of comprehensive network architectures and parameter selection mechanisms, such that the practical applicability of the stock price prediction is lowered.

Since many factors affect the stock price and correlations exist among variables, therefore selection used as a parameter of the neural network model becomes the most influential factor of a stock price and an important index of an accurate predicted stock price. For example, there is no specific method for the decision of hidden layers of interactions among inputted parameters of a recurrent neural network. If too many parameters are used in the hidden layer of a complicated model, the network will lack of the ability of mathematical induction. If too few parameters are used in the hidden layer, the network will be unable to obtain an accurate prediction result. Therefore, the design of an effective relative variable selection system and an effective selection method thereof is an important subject that demands immediate attentions and feasible solutions.

SUMMARY OF THE INVENTION

In view of the problems of the prior art, it is a primary objective of the present invention to provide a relative variable selection system and a selection method thereof to overcome the problems of the conventional prediction methods having too many complicated parameters that cause a complicated prediction and an inaccurate prediction result.

To achieve the foregoing objective, the present invention provides a relative variable selection system comprising: a receiving module, a first selection module, a first calculating module, a second selection module, a second calculating module and a third selection module. The receiving module receives a plurality of variables. The first selection module is coupled to the receiving module for sequentially selecting the plurality of variables with the correlation coefficient greater than a first threshold according to a correlation coefficient of each variable. The first calculating module is coupled to the first selection module for calculating a regression value and a weighted value of each corresponding variable according to plurality of variables selected by the first selection module. The second selection module is coupled to the first calculating module for sequentially selecting the plurality of variables with the weighted value smaller than a second threshold according to the plurality of weighted values. The second calculating module is coupled to the second selection module for calculating an analyzed value of each variable according to the plurality of variables selected by the second selection module. The third selection module is coupled to the second calculating module, for selecting the plurality of analyzed values greater than a target value, according to the plurality of analyzed values.

To achieve the foregoing objective, the present invention further provides a relative variable selection method comprising the following steps of: receiving a plurality of variables by a receiving module; sequentially selecting the plurality of variables with the correlation coefficient greater than a first threshold by a first selection module according to a correlation coefficient of each variable; calculating a regression value and a weighted value of each variable by a first calculating module according to the plurality of variables selected by the first selection module; sequentially selecting the plurality of variables with the weighted value smaller than a second threshold by a second selection module according to the plurality of weighted values; calculating an analyzed value of each variable by a second calculating module according to the plurality of variables selected by the second selection module; and selecting the plurality of analyzed values greater than a target value by a third selection module according to the plurality of analyzed values.

Wherein, the first selection module determines whether or not the absolute value of each correlation coefficient is greater than the first threshold to sequentially select the plurality of variables.

Wherein, the present invention further comprises a sorting module coupled to the receiving module, the sorting module for sorting the plurality of variables according to the absolute value of each correlation coefficient.

Wherein, one of the analyzed values is equal to a mean square regression divided by a mean square error.

Wherein, the third selection module will stop the selection if the final selection of the plurality of analyzed values is finished.

Wherein, the first threshold is equal to 0.4.

In summation, the relative variable selection system and the selection method thereof in accordance with the present invention have one or more of the following advantages:

(1) The relative variable selection system and the selection method thereof can select relative variables effectively to overcome the problem of having too many complicated parameters in the model and adopt the prediction system that uses the neural network as a base in conjunction with the parameter optimization and algorithm development to reduce the prediction deviation values, so as to enhance the ability of predicting the stock price.

(2) The relative variable selection system and the selection method thereof can select relative variables effectively to overcome the problem of having too many complicated parameters in the model and adopt the prediction system that uses the neural network as a base in conjunction with the parameter optimization and algorithm development to reduce the prediction deviation values so as to use on various prediction areas, such as predicting the electric bill of the coming day.

DETAILED DESCRIPTION OF THE PREFERRED EMBODIMENTS

The relative variable selection system and selection method thereof in accordance with the present invention will become apparent with the detailed description of preferred embodiments together with related drawings as follows. It is noteworthy to point out that same numerals are used for representing respective elements in the description of the preferred embodiments and the illustration of the drawings.

Figure 1:
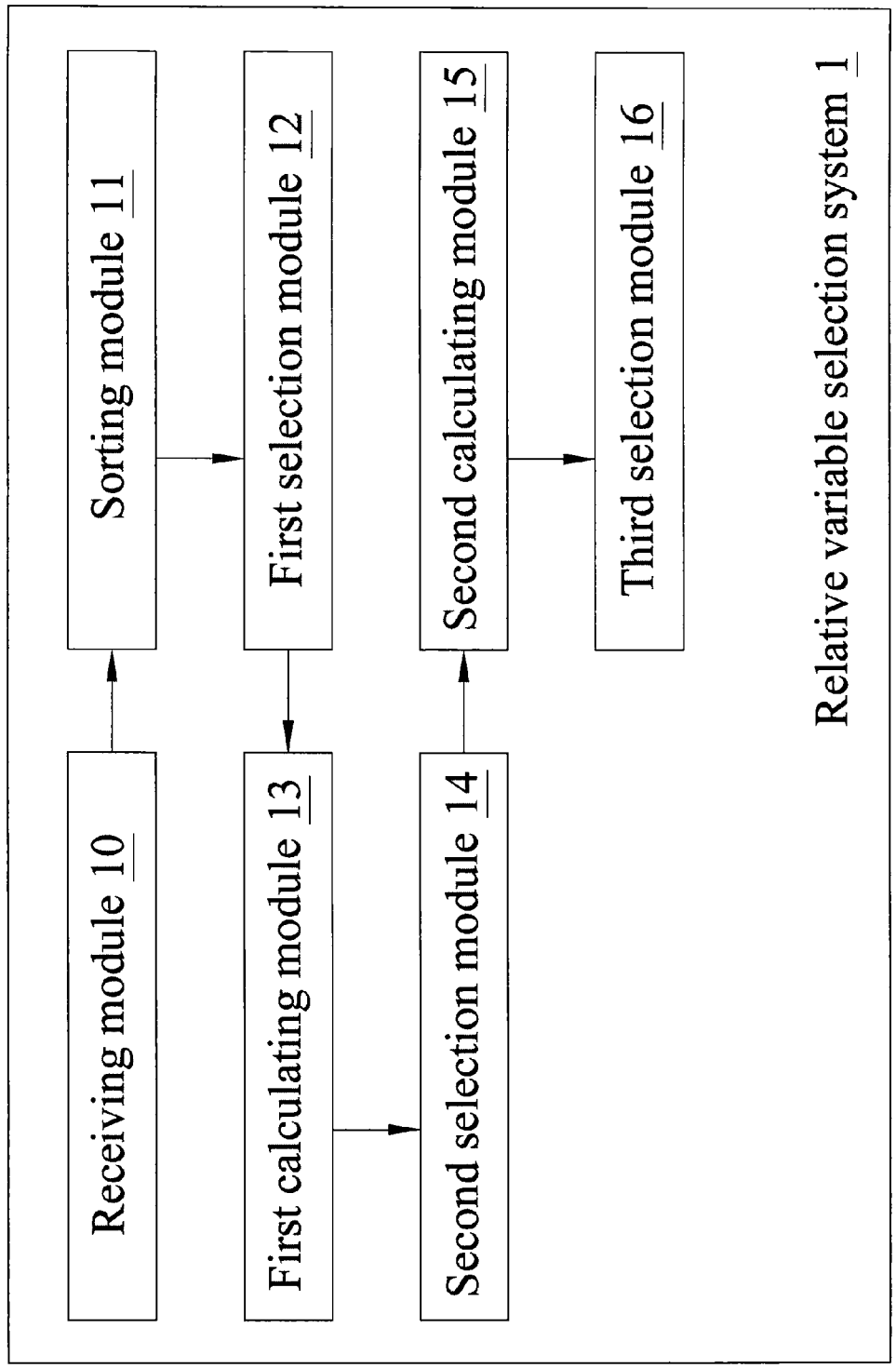
FIG. 1 is a block diagram of a relative variable selection system in accordance with a preferred embodiment of the present invention.

With reference to FIG. 1 for a block diagram of a relative variable selection system in accordance with a preferred embodiment of the present invention, the relative variable selection system 1 comprises a receiving module 10, a sorting module 11, a first selection module 12, a first calculating module 13, a second selection module 14, a second calculating module 15 and a third selection module 16. The receiving module 10 receives a plurality of variables. The sorting module 11 is coupled to the receiving module 10 for sorting the plurality of variables according to the absolute value of each correlation coefficient. The first selection module 12 is coupled to the sorting module 11 for sequentially selecting the plurality of variables with the correlation coefficient greater than a first threshold according to the absolute value of a correlation coefficient of each variable. In this preferred embodiment, the first threshold is equal to 0.4. The first calculating module 13 is coupled to the first selection module 12 for calculating a regression value and a weighted value of each variable according to the plurality of variables selected by the first selection module 12. In this preferred embodiment, the first selection module 12 is coupled to the receiving module 10 for sequentially selecting the plurality of variables with the correlation coefficient greater than a first threshold. The aforementioned embodiment is provided for the purpose of illustrating the present invention only, but not intended for limiting the scope of the invention. The second selection module 14 is coupled to the first calculating module 13 for sequentially selecting the plurality of variables with the weighted value smaller than a second threshold according to the plurality of weighted values.

Continuing the aforementioned embodiment, the second calculating module 15 is coupled to the second selection module 14 for calculating an analyzed value of each variable according to the plurality of variables selected by the second selection module 14. Wherein, each of the plurality of analyzed values is equal to a mean square regression divided by a mean square error. The third selection module 16 is coupled to the second calculating module 15 for selecting the plurality of analyzed values greater than a target value according to the plurality of analyzed values. When the final selection of the plurality of analyzed values is finished, the third selection module 16 stops the selection. The persons ordinarily skilled in the art should understand that the preferred embodiments are provided for illustrating the present invention, but not for limiting the present invention. Any combination or separation of the aforementioned functional modules can be made depending on the required design.

In another embodiment, the recursive neural integration analysis system according to the bees algorithm is used for describing the relative variable selection system and the selection method of the present invention.

Firstly, the relative variable selection system adopts a selection method that uses a stepwise regression correlation selection (SRCS) to create input factors. In this preferred embodiment, data including basic factors and technical factors are listed first. After the data are processed by a wavelet transform, the stepwise regression correlation selection can select the most influential factor.

Wherein, the operating method of the stepwise regression correlation selection is divided into the following stages: Firstly, candidate input factors are loaded into a receiving module 10, and then a correlation coefficient of each target dependent variable corresponding to each factor is determined. After that, the absolute values are sorted in a descending order by the correlation coefficients, and the input factor with an absolute value of the correlation coefficient smaller than 0.4 is deleted, and the p value of each input factor is used for examining the significance of each factor to a target dependent variable to create a regression model of the target dependent variable.

By using the aforementioned method to select a plurality of factors, it is necessary to further use the F value of each factor to check whether the statistical significance exist. The F value is equal to a mean square regression divided by a mean square error as shown in the following equation:

$$F_j = \frac{MSR(X_j \mid X_1, \ldots, X_{j-1}, X_{j+1}, \ldots, X_k)}{MSE(X_1, \ldots, X_k)} \qquad (1)$$

$$F_j^* = \max_{1 \le j \le k}(F_j) \qquad (2)$$

If the F value of a certain factor is smaller than a user-defined threshold, then the factor will not have the statistical significance and will be deleted. If each factor in the regression model examined by the aforementioned method has the statistical significance, then the stepwise regression correlation selection will be terminated.

It is noteworthy to point out that when the stepwise regression correlation selection method is used for selecting important factors, each factor corresponding to the dependent variable must have substantial significance. In this example, the level of significance is set to 0.001. If the p value of a specific variable is smaller than 0.001, the variable is considered as a significant factor and will be added into the regression model. If the p value of a specific variable is greater than 0.001, the variable is considered as a non-significant factor and will be deleted from the regression model.

For the F value, the threshold of this example is set to 4. If the F value of a specific variable is greater than 4, then the variable is considered as a significant factor and will be added into the regression model. If the F value of a specific variable is smaller than 4, then the variable is considered as a non-significant factor and will be deleted from the regression model.

Figure 2:
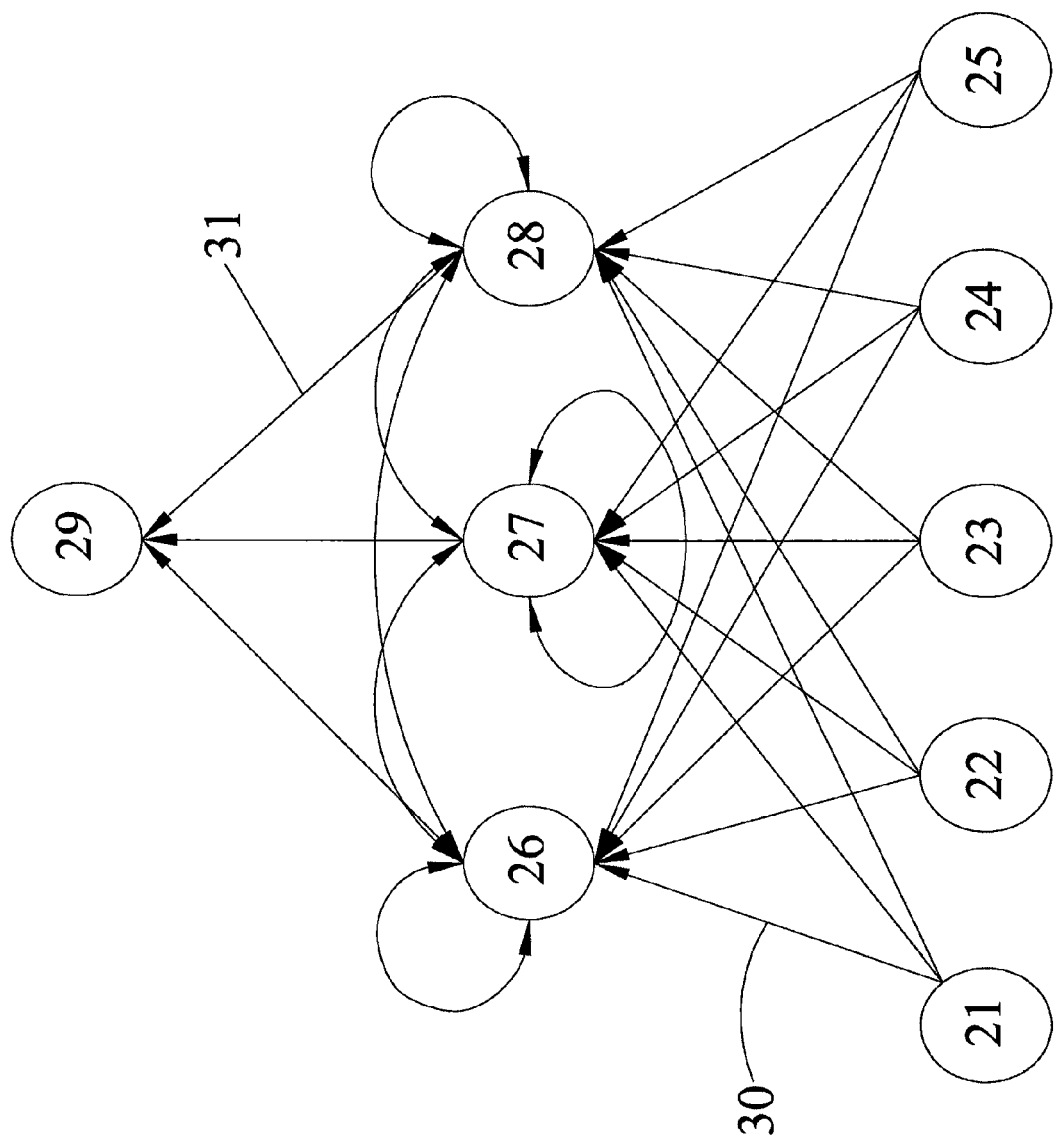
FIG. 2 is a schematic diagram of a recursive neural network in accordance with a preferred embodiment of the present invention.

With reference to FIG. 2 for a schematic diagram of a recursive neural network in accordance with a preferred embodiment of the present invention. The advantage of using the recursive neural network is its ability of performing complicated computations and learning a temporal series mode such as a time-variant series. The recursive neural network of this preferred embodiment includes four major portions, respectively: an input layer, a hidden layer, a collection layer and an output layer. Wherein, each hidden neuron is connected to its own or other neuron and each connection have its weighted value and deviation value. The bees algorithm can be used for computing the neural network training process to find the weighted value (w) of each connection between the input layer, hidden layer and output layer and the deviation value (b) of each hidden layer and output layer. In FIG. 2, the input layers are numbered with 21, 22, 23, 24, and 25, the hidden layers are numbered with 26, 27 28, and the output layers is number with 29. The numeral 30 stands for the weighted value $w_{61}$ of the portion connected from the input layer 21 to the hidden layer 26, and the numeral 31 stands for the weighted value $w_{98}$ of the portion connected from the hidden layer 28 to the output layer 29. The weighted values of the connected input layer, hidden layer and output layer can be derived. In addition, the hidden layers 26, 27, 28, and the output layer 29 have the deviation values $b_{26}$, $b_{27}$, $b_{28}$, and $b_{29}$.

Continuing the aforementioned embodiment, the bees algorithm is a basic recursive algorithm of a group, and the group intelligent behavior of a bee's searching for food can be used for developing an optimization algorithm for searching a food source with the largest amount of nectar. The bees algorithm primarily involve three kinds of bees including the worker bee, patrol bee and scout bee in a colony of bees, and each food source represents a possible solution corresponding to the studied problem, and the quantity of food sources is equal to the number of solutions.

In this preferred embodiment, a number (SN) of initial solution will be created randomly when the algorithm starts, wherein SN stands for the number of worker bees or patrol bees, and the number of worker bees is equal to the number of patrol bees. Each food source which is also the solution $X_h$ (h=1, 2, . . . , SN) stands for a one-dimensional vector d, and d is the optimal number of parameters required for the problem. In the entire bees algorithm. The process of finding the solution is limited by the setting of the maximum cycle number (MCN). The search will stop when the set MCN is reached.

After the random initial setting of the food source is completed, a worker bee will be placed in an area of each food source, and then the amount of nectar in the food source where each worker bee is located (or the goodness of fit) will be evaluated, and the evaluation is carried out by the goodness of fit function (3) as follows:

$$fit_i = \begin{cases} \frac{1}{f_i+1}, & f_i \geq 0 \\ 1+|f_i|, & f_i < 0 \end{cases} \quad (3)$$

Wherein, $f_i$ is the $i^{th}$ solution (food source) of a target function in the problem. Then, each worker bee evaluates the goodness of fit of the nearby food source from its own location. If the goodness of fit of the nearby food source is greater than the goodness of fit of the current position of the worker bee, then the worker bee will move to the new food source. The neighbor solution can be found by Equation (4):

$$S_{hj}=X_{hj}+u(X_{hj}-X_{kj}) \quad (4)$$

Wherein, u is a uniform random variable of [−1, 1], $X_h$=$(X_{h1}, X_{h2}, \ldots, X_{hd})$ stands for the location of the current food source, $S_h$ stands for another food source near $X_h$, and the difference between $S_h$ and $X_h$ resides on that $S_h$=$(X_{h1}, X_{h2}, \ldots X_{h(j-1)}, S_{hj}, X_{h(j+1)}, \ldots X_{hd})$. In other words, besides the element of the dimensional parameter j, both elements are equal, and the element situated at J is determined by Equation (4). The parameter j is a randomly selected integer in [1, d].

After the worker bee completes a nearby search, the worker bee will send the final obtained information of the food source to the patrol bee, and the patrol bee starts evaluating the goodness of fit of the nearby food source from the position of the patrol bee. If the goodness of fit of the nearby food source is greater than that of current one, then the patrol bee will shift to the new food source. Similarly, a neighbor solution of the best food source searched by the final worker bee can be found by Equation (4) and used for a further search. Finally, the patrol bee compares the goodness of fit of its own solution with the solution provided by the worker bee according to Equation (5).

$$P_h = \frac{fit_h}{\sum_{h=1}^{SN} fit_h} \quad (5)$$

In Equation (5), the denominator includes the summation of the goodness of fit food of areas searched by patrol bees and provided by worker bees, which stands for the percentage of all possible solutions of the goodness of fit of each food source during the patrol stage, and then the food source with a higher goodness of fit is selected.

It is noteworthy to point out that if a solution processed through a number of tolerance loops as set in Equation (6) in a regression process still cannot generate a better food source, then such solution will be taken over by a scout bee, and a new solution will be generated through Equation (7). If the new solution has a higher goodness of fit, then it will replace the previous solution, or else the previous solution will be kept.

$$\text{limit}=SN \times d \quad (6)$$

$$X_h^j = X_{min}^j + \text{rand}[0,1](X_{max}^j - X_{min}^j)$$

Even though the concept of the relative variable selection method for the relative variable selection system of the present invention has been described in the section of the relative variable selection system, a flow chart is used for illustrating the method as follows.

Figure 3:
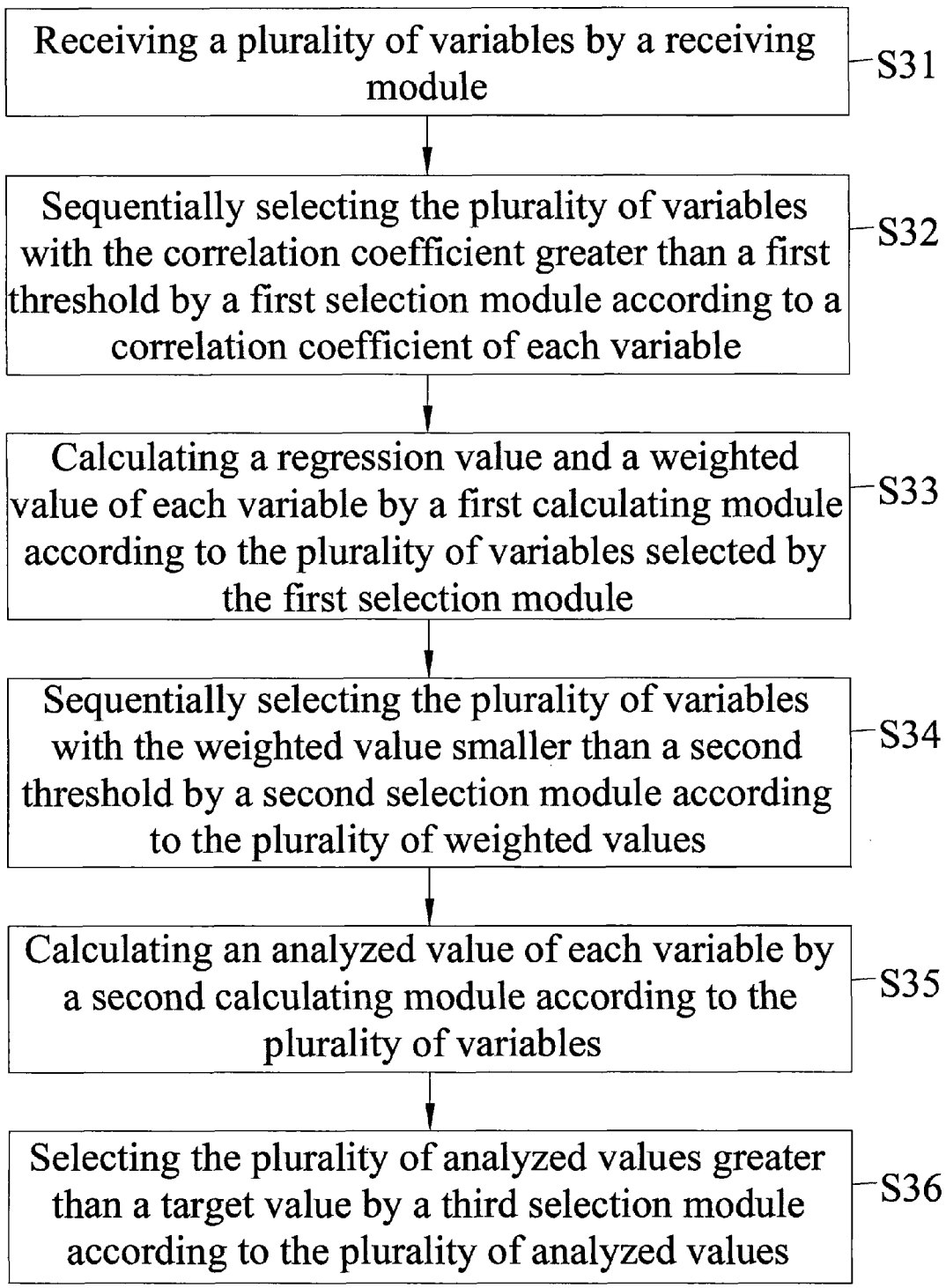
FIG. 3 is a flow chart of a relative variable selection method of the present invention.

With reference to FIG. 3 for a flow chart of a relative variable selection method in accordance with the present invention, the relative variable selection method is applicable to a relative variable selection system comprising a receiving module, a sorting module, a first selection module, a first calculating module, a second selection module, a second calculating module and a third selection module. The relative variable selection method of the relative variable selection system comprises the steps of:

(S31) receiving a plurality of variables by a receiving module;

(S32) sequentially selecting the plurality of variables with the correlation coefficient greater than a first threshold by a first selection module according to a correlation coefficient of each variable;

(S33) calculating a regression value and a weighted value of each variable by a first calculating module according to the plurality of variables selected by the first selection module;

(S34) sequentially selecting the plurality of variables with the weighted value smaller than a second threshold by a second selection module according to the plurality of weighted values;

(S35) calculating an analyzed value of each variable by a second calculating module according to the plurality of variables selected by the second selection module; and (S36) selecting the plurality of analyzed values greater than a target value by a third selection module according to the plurality of analyzed values.

The details and implementation method of the relative variable selection method for the relative variable selection system of the present invention have been described in the aforementioned relative variable selection system of the present invention, and thus will not be described here again.

In summation of the description above, the relative variable selection system and the selection method thereof in accordance with the present invention can select relative variables effectively to overcome the problem of having too many complicated parameters in the model and adopt the prediction system that uses the neural network used as a base in conjunction with the parameter optimization and algorithm development to reduce the prediction error. The present invention can be used in many prediction areas such as the prediction of stock prices or an electric bill of the coming day.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A computer-implemented relative variable selection system, comprising:
    a receiving module, for receiving a plurality of variables;
    a first selection module, coupled to the receiving module, for sequentially selecting the plurality of variables with a correlation coefficient greater than a first threshold according to the correlation coefficient of each variable;
    a first calculating module, coupled to the first selection module, for calculating a regression value and a weighted value of each variable according to the plurality of variables selected by the first selection module;
    a second selection module, coupled to the first calculating module, for sequentially selecting the plurality of variables with the weighted value smaller than a second threshold according to the plurality of weighted values;
    a second calculating module, coupled to the second selection module, for calculating an analyzed value of each variable according to the plurality of variables selected by the second selection module; and
    a third selection module, coupled to the second calculating module, for selecting the plurality of analyzed values greater than a target value according to the plurality of analyzed values.

2. The computer-implemented relative variable selection system according to claim 1, wherein the first selection module determines whether or not the absolute value of each correlation coefficient is greater than the first threshold to sequentially select the plurality of variables.

3. The computer-implemented relative variable selection system according to claim 2, further comprising a sorting module coupled to the receiving module for sorting the plurality of variables according to the absolute value of each correlation coefficient.

4. The computer-implemented relative variable selection system according to claim 1, wherein one of the plurality of analyzed values is equal to a mean square regression divided by a mean square error.

5. The computer-implemented relative variable selection system according to claim 1, wherein the third selection module stops the selection when the final selection of the plurality of analyzed values is finished.

6. The computer-implemented relative variable selection system according to claim 1, wherein the first threshold is equal to 0.4.

7. A relative variable selection method, comprising steps of:
    receiving a plurality of variables by a receiving module;
    sequentially selecting the plurality of variables with the correlation coefficient greater than a first threshold by a first selection module according to a correlation coefficient of each variable;
    calculating a regression value and a weighted value of each variable by a first calculating module according to the plurality of variables selected by the first selection module;
    sequentially selecting the plurality of variables with the weighted value smaller than a second threshold by a second selection module according to the plurality of weighted values;
    calculating an analyzed value of each variable by a second calculating module according to the plurality of variables selected by the second selection module; and
    selecting the plurality of analyzed values greater than a target value by a third selection module according to the plurality of analyzed values.

8. The relative variable selection method according to claim 7, further comprising step of: using the first selection module to determine whether or not the absolute value of each correlation coefficient is greater than the first threshold to sequentially select the plurality of variables.

9. The relative variable selection method according to claim 8, further comprising step of: providing a sorting module for sorting the plurality of variables according to an absolute value of each correlation coefficient.

10. The relative variable selection method according to claim 7, wherein one of the plurality of analyzed values is equal to a mean square regression divided by a mean square error.

11. The relative variable selection method according to claim 7, further comprising step of: stopping the selection by the third selection module when the final selection of the plurality of analyzed values is finished.

12. The relative variable selection method according to claim 7, wherein the first threshold is equal to 0.4.

* * * * *